United States Patent [19]
Broach

[11] Patent Number: 5,820,362
[45] Date of Patent: Oct. 13, 1998

[54] FLUID CONTROL

[75] Inventor: George C. Broach, Tulsa, Okla.

[73] Assignee: The G. C. Broach Company, Tulsa, Okla.

[21] Appl. No.: 873,810

[22] Filed: Jun. 12, 1997

[51] Int. Cl.⁶ .................................................. F24H 8/00
[52] U.S. Cl. .......................... 432/29; 432/209; 122/7 R; 34/86; 165/DIG. 12
[58] Field of Search ..................... 432/29, 209; 122/7 R; 34/86; 165/DIG. 12

[56] References Cited

U.S. PATENT DOCUMENTS

| | | |
|---|---|---|
| 2,441,594 | 1/1948 | Ramseyer .................................. 432/29 |
| 3,861,334 | 1/1975 | Stockman . |
| 3,913,501 | 10/1975 | Dahar . |
| 4,101,265 | 7/1978 | Broach . |
| 4,262,608 | 4/1981 | Jackson . |
| 4,449,569 | 5/1984 | Lisi et al. . |
| 4,460,331 | 7/1984 | Robson et al. ............................ 432/29 |
| 4,485,746 | 12/1984 | Erlandsson . |
| 4,628,869 | 12/1986 | Symsek et al. . |

Primary Examiner—Teresa J. Walberg
Assistant Examiner—Jiping Lu
Attorney, Agent, or Firm—Robert E. Massa

[57] ABSTRACT

A furnace for heating a process fluid stream which includes means for efficiently controlling a flow of the process fluid stream through an adjunct loop of the fluid stream. The adjunct loop comprises a heat exchange system in which a portion of the process fluid stream collects heat from flue gases being emitted from the furnace and donates heat to combustion air being used in the furnace. Valve means is positioned downstream of a pump and in connection with the fluid stream in order to constantly replenish a small portion of fluid in the adjunct loop with fresh process fluid. The positioning of the valve means downstream of the pump permits more efficient control of the heat exchange system. One form of valve means may be a valve which will permit a small amount of fluid to continue to flow between the fluid stream and the adjunct loop during a non-operating mode of the adjunct loop heat exchange component.

12 Claims, 2 Drawing Sheets

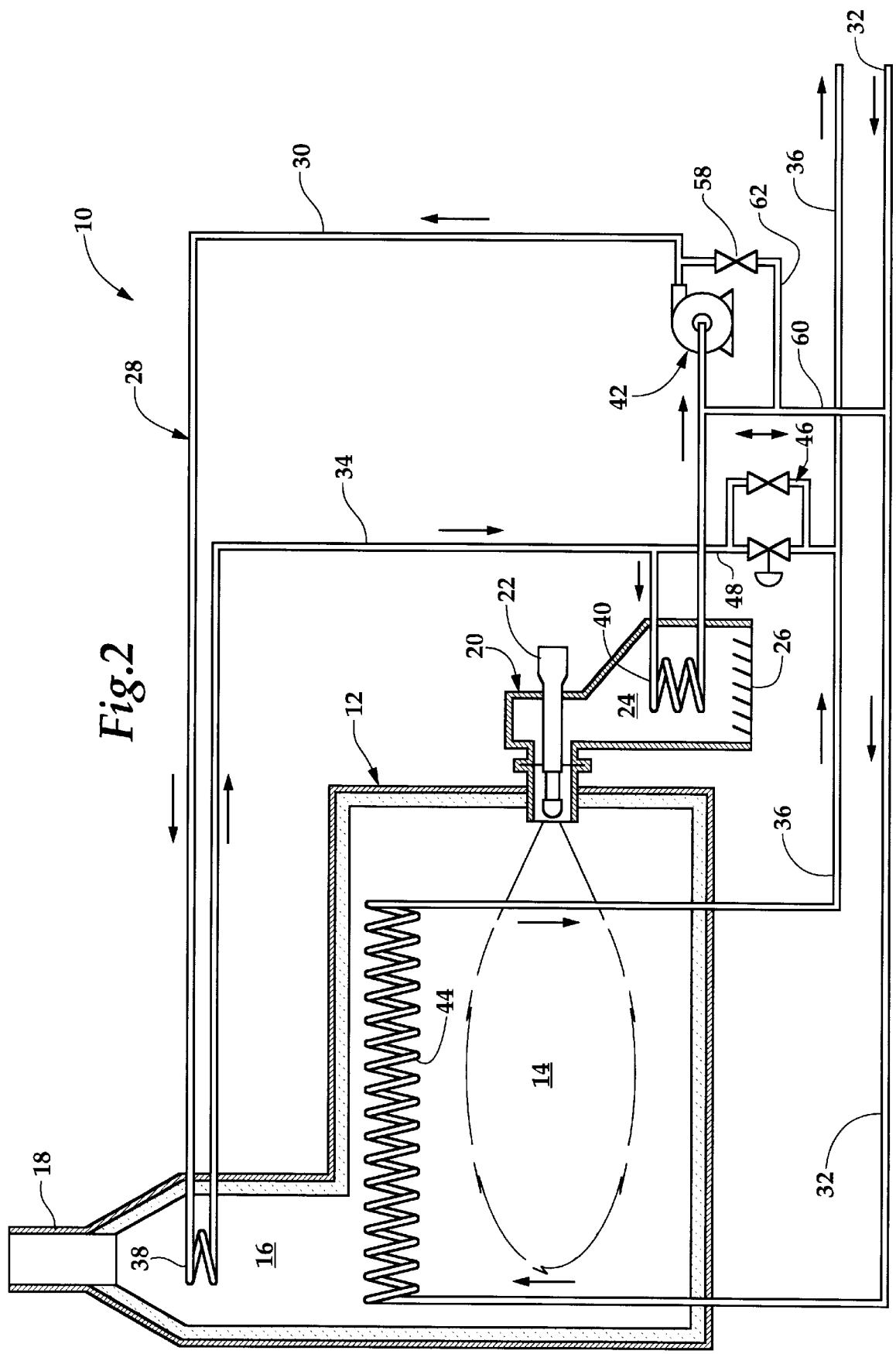

FLUID CONTROL

FIELD OF THE INVENTION

My invention relates to heat exchange systems which provide efficient means for supplying heat to a fluid process stream. More particularly, my invention relates to a heat exchange system in which a portion of a process fluid stream recovers heat from combustion gases exiting a furnace and donates such heat to combustion air entering the furnace, thus to provide a more readily controllable system for heating a larger portion of a process stream being heated by the furnace. Still more particularly, my invention relates to a heat exchange system which provides controllable cooperation between a pump component and valve means connected to the process stream in a manner to efficiently control temperature of the heat exchange system and to efficiently replenish heat exchange fluid.

BACKGROUND OF THE INVENTION

The most basic concept of heat exchange may be described as a transfer of heat from a means for producing heat to a means for accepting that heat.

For example, a heat exchange system may comprise a first device which is constructed to accept heat from a fluid stream in a manner to transfer heat from that fluid stream to a second device through which another fluid stream passes without any mixing of the two fluid streams. A simple form of such heat exchanger comprises an automobile radiator. In this heat exchanger the auto engine pumps heated water into the radiator in which the heated water is cooled by the action of air being driven through the radiator so that cooled water may flow back into the engine. The heated water and the cool air are independent.

A similar concept comprises a typical shell and tube heat exchange unit in a chemical processing plant in which a sealed shell encloses a length of tubing in a manner that heat may pass from a hot fluid to a cooled fluid within the tubing without mixing of the fluids in the shell and tubing.

Obviously, in the processing of a fluid stream, a means for controlling a temperature difference between two fluids in a heat exchange operation must be provided based upon the proper reaction temperature of the process stream. Some control of the efficiency of the operation may be given to this type of operation by designing shell and tube components having a maximum area of interaction between the shell and tube components.

As a process system becomes more complex, much more intricate means for controlling the temperature difference between a heat exchange fluid and a process stream must be devised. Merely multiplying surface area of interaction might not provide sufficient control. Usually, a means for controlling an input temperature of the process stream or an output temperature of a heat donating fluid might make suitable temperature control.

A still more complex process system involves a form of combustion apparatus in which a flame and/or heated air provides the energy for the process system in association with efficient control means for controlling and regulating the amount of heat generated by a furnace, the temperature of heated air, the rate of flow of combustion air and heated air, and the rate of flow and temperature of a process fluid stream.

Economic feasibility must be correlated with physical limitations inherent in the processing of a fluid stream. The greatest economic benefit could be achieved if a process system permits a most rapid flow of process fluid through the heat system, but process operations must be tempered by the reaction time and temperature limitations of the processes. Always, a heated process operation must be carefully monitored to achieve the most efficient operation gained by the careful control of the entire system.

Previously, members of my company had designed and developed an efficient heat exchange system for a fluid process stream and combustion furnace which is designated as an adjunct loop system for efficient heating of combustion air.

The adjunct loop heat exchange system comprises the following components and steps:

1. A heat exchange component which includes a heat collecting coil and a heat donating coil associated with a furnace.

2. A portion of a parent process fluid stream is directed through the heat collecting coil and heat donating coil at a controllable rate.

3. The portion of process fluid passes through the heat collecting coil in non-contact relation with flue gases for collection of heat from flue gases exiting the furnace, and passes through the heat donating coil to transfer heat to combustion air entering the furnace.

I found the following patents during a search of the prior art in this field:

U.S. Pat. No. 3,861,334 Stockman Jan. 21, 1975
U.S. Pat. No. 3,913,501 Dahar Oct. 21, 1975
U.S. Pat. No. 4,101,265 Broach et al Jul. 18, 1978
U.S. Pat. No. 4,262,608 Jackson Apr. 21, 1981
U.S. Pat. No. 4,449,569 Lisi et al May 22, 1984
U.S. Pat. No. 4,485,746 Erlandsson Dec. 4, 1984
U.S. Pat. No. 4,628,869 Symsek et al Dec. 16, 1986

U.S. Pat. No. 3,861,334 to Stockman describes an incinerator wherein hot exhaust gases are directed in heat exchange relation with heat exchange fluid in a boiler. Exhaust gas is diluted with cooled gas that exits the boiler. An afterburner placed in the exhaust stack provides means for maintaining a chosen temperature in the afterburner chamber.

U.S. Pat. No. 3,913,501 to Dahar describes an incinerator for waste material containing both organic and inorganic material. The system provides a combustion chamber having means at the bottom for collecting ash produced, and includes means for supplying combustion air to the interior of the combustion chamber including a plurality of vertically spaced apertured ducts within the lower portion of the combustion chamber.

U.S. Pat. No. 4,101,265 to Broach et al is the closest of these references. My present invention is found to be more energy efficient than this prior invention developed by members of our company. Broach et al describes a heat exchange system in which a portion of a process fluid stream performs as a heat exchange fluid. A loop member in communication with a process fluid stream comprises a first portion within a furnace for collecting heat from flue gases and a second portion within a combustion chamber for donating heat to combustion air. A pump in the loop member provides means for circulating the fluid into and through the loop at a controllable rate of circulation substantially independently of the fluid process stream. A valve in the loop may be closed to direct fluid flow through the loop. If the pump should become inoperative, the valve is opened, and in conjunction with a pressure differentiation induced by a restriction in the fluid stream, a portion of the process fluid stream is directed through the adjunct loop to prevent overheating of the loop component.

U.S. Pat. No. 4,262,608 to Jackson describes a combination flue products exhaust and combustion air supplied for and limited to vented gas burning devices. Exhaust products are given a positive exhaust while balanced pre-heated combustion air is driven into the combustion compartment. An air intake pipe delivers combustion air upon selective activation of the air intake fan. An exhaust pipe delivers the flue gases to the atmosphere upon selective activation of an exhaust fan. An air intake damper and a flue products exhaust damper operate automatically to close the flue products exhaust line when the fans are not running.

U.S. Pat. No. 4,449,569 to Lisi et al describes an air preheater for supplying heated air to a furnace through parallel-connected conduits with heat transfer performed by the movement through a second of such conduits. Rate of flow of air to be preheated is determined by temperature and/or pressure differentials at points of joinder of two sets of conduits.

U.S. Pat. No. 4,485,746 to Erlandsson describes an energy system for an incinerator connected to a stack, an auxiliary conduit forming a lower extension of the stack, an outlet conduit connected to the stack downstream of the auxiliary conduit, a boiler connected between the auxiliary conduit and the outlet conduit, a burner connected to the auxiliary conduit which becomes operable to supply heat to the boiler when the incinerator is not operating, a blower located in outlet conduit to assist outlet flow of flue gases, a damper in the outlet conduit between the boiler and blower, a temperature sensor in a conduit between incinerator and stack which determines mode of operation of incinerator and burner, a first flow sensing mechanism in outlet conduit upstream of the burner, a second flow sensing mechanism in stack downstream of connection of auxiliary conduit. Burner becomes operative when incinerator is not operating, and first flow sensing mechanism controls damper to direct heated gases from burner through boiler. When incinerator is operating, second flow sensing mechanism controls damper to direct heated gases through auxiliary conduit to boiler.

U.S. Pat. No. 4,628,869 to Symsek et al describes a system for recovering waste heat from a variable temperature process heater exhaust stack. Includes a heat exchanger collecting heat from the waste gas stack with heat delivered thereby to a heat reservoir. The heat transfer fluid passes independently to two heat exchangers, one for combustion air and one for fuel gas. The heated combustion air and fuel gas then return to the process heater. A source of pressurized inert gas passes through a line to the reservoir in sufficient pressure to maintain the heat transfer fluid in liquid condition throughout the circuit.

SUMMARY OF THE INVENTION

The primary object of my invention is to provide a heat exchange system which is efficient, easy to operate, and easy to maintain.

Another object of my invention is to provide a heat exchange system which achieves efficient control of a heat exchange fluid and process fluid.

Still another object of my invention is to provide a heat exchange system for easily and accurately determining and controlling a temperature for heating a fluid stream.

Still another object of my invention is to provide a heat exchange system in which a temperature and degree of mixture of heated fluids may be easily controlled.

Another object of my invention provides a means for more efficiently achieving higher energy levels in the heating of a fluid stream than previously obtained.

My invention describes and explains a further improved heat exchange system which enhances the levels of efficiency in the transfer of heat and rate of flow within the heat exchange system.

I show an improvement of a formerly-described adjunct loop type of heat exchange system by including a valve system downstream of pump means within the heat loop of the system. Essentially, as previously explained, the loop portion of the system is designed to provide a controllable mixture of a portion of a process fluid stream with a heated stream of process fluid circulating within the loop member. The loop member comprises basically two loop components: one loop component positioned within a furnace stack for collection of heat, and a second loop component positioned within a combustion air compartment of a furnace for donating of heat to the combustion air. This structure returns otherwise escaping energy to the system and makes the operation more efficient by the heating of combustion air.

The adjunct loop system preferably comprises a heat collection coil in a flue stack and a heat donation coil in the combustion air chamber of the furnace. A chosen amount of the original process fluid is removed from the process stream and directed into the heat collection coil to flow through the heat collection coil to collect heat from the heated flue gases. The heat collecting fluid then flows through the heat donation coil in the combustion air chamber to donate heat to the combustion air. After donating heat, the fluid leaves the heat donating coil, is consequently still hotter than the portion of process fluid entering the loop in advance of the heat collecting coil. Therefore, a certain amount of this heated fluid is replaced at a chosen rate by cooler fresh process fluid.

I have found that I can control the rate of flow and temperature of fluid circulating through the adjunct loop by including suitable control valve means downstream of a pump component of the adjunct loop, valve means which provides communication between the adjunct loop and the parent process fluid stream.

The above objects and advantages of my invention will become apparent from my description of the following preferred embodiments and claims of my invention.

BRIEF DESCRIPTION OF THE DRAWINGS

FIG. 2 is a sectional view of an alternate embodiment of heat exchange system according to my invention.

DESCRIPTION OF THE PREFERRED EMBODIMENTS

Figure 1:
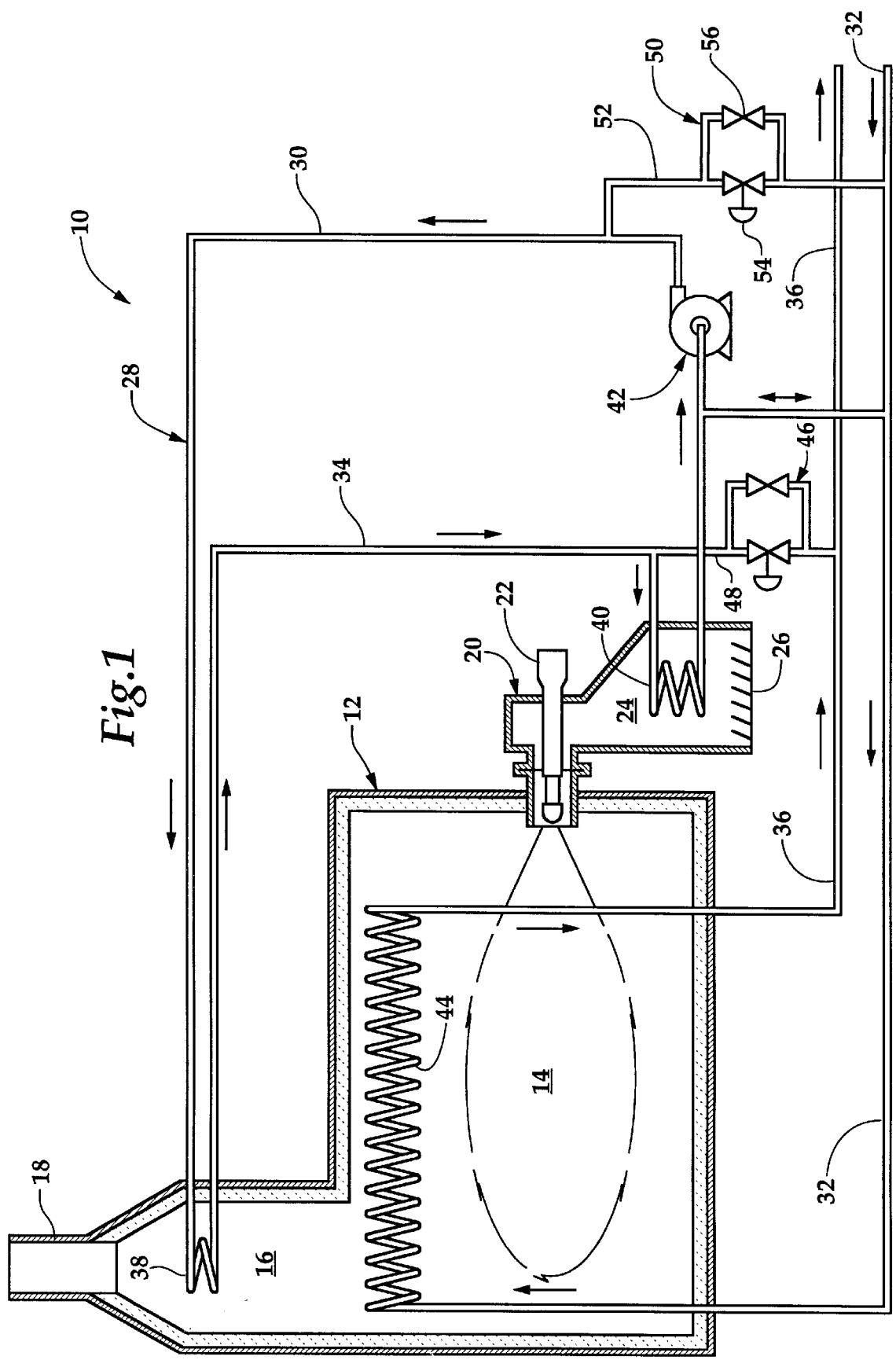
FIG. 1 is a sectional view of a typical adjunct loop heat exchange system according to my invention.

My invention describes a combustion system in which a heat exchange component is positioned by recover heat from the products of combustion and to donate heat to a reactant to generate a more efficient combustion reaction.

In one form of my invention a process fluid stream is indirectly heated within a conventional combustion furnace of the heat exchange system and donates a part of this heat to a reactant within a combustion burner chamber of that system.

In FIG. 1 I show one embodiment of this system in which an adjunct portion of a fluid process stream collects heat from within a furnace and extends to a burner in order to donate heat to combustion air entering the burner to provide heated air to the burner to enhance the efficiency of the combustion operation.

My entire process and heating system 10, generally, comprises a conventional process furnace 12, generally, which includes a radiant section 14, a convection section 16, and a stack 18.

A conventional means for supplying process heat to the interior of the furnace 12 comprises a typical combustion burner 20 having a source of fuel 22 and a source of air 24. Controllable louvers 26 may be adjusted as needed in coordination of the incidental process heating requirements.

An adjunct loop component 28, referred to above, comprises basically a first fluid leg 30 in communication with an inlet line 32 of a process fluid stream, and a second fluid leg 34 in communication with an outlet line 36 of the process fluid stream.

Typically, adjunct loop component 28 performs the operation of preheating combustion air passing through louvers 26 by directing the flow of a portion of the process fluid stream through a heat collecting member 38 positioned within the convection section 16, and a heat donating member 40 positioned within combustion burner 20 in proper position to supply heat to combustion air entering the burner 20.

A pump 42 directs a portion of the process fluid stream through the adjunct loop 28 as required by the operating conditions of the process. The pump 42 may be placed in either the operating mode or the non-operating mode.

As I show in FIGS. 1 and 2, a typical process involved in this operation includes a process coil 44 within the radiant section 14 of the process furnace 12. Process coil 44 collects a portion of the process fluid stream which has been somewhat heated by passage through the adjunct loop 28.

I have found that in addition to valve-bypass component 46, generally, in line 48, an efficient component of our previous adjunct loop system, I greatly increased the efficiency of our process system by the inclusion of a valve-trickle valve member 50, generally, in line 52 communicating with lines 30 and 36 downstream of the pump 42.

The valve-trickle valve 50 includes a manual valve 54 and a trickle valve 56.

The valve-trickle component 50 further enhances the efficiency of the system by giving more precise control of the temperature and flow conditions of the system. If necessary, or desired, during a phase of the process, manual valve 54 may be fully open to permit a controllable flow of process fluid to flow from line 30 into line 36.

Then, the incorporation of trickle valve 56 allows a small portion of the fluid to exit the adjunct loop 28 constantly, thereby permitting fresh process fluid to flow into and through the adjunct loop 28 during a non-operating mode of the adjunct loop, as occurs particularly when the pump 42 is not operating.

In FIG. 2 I show an alternate means of replenishing process fluid flowing through the adjunct loop 28 with fresh fluid from the process fluid stream through inlet line 32. I have positioned a pump bypass check valve 58 downstream of the pump 42, placing adjunct loop line 30 in communication with process line 32.

Valve 58 connects lines 32 and 34 by means of line 60 and line 62.

Pump bypass check valve 58 provides a means for replenishing a small portion of fluid flowing through the adjunct loop 28 constantly with fresh process fluid from line 32.

Since many different embodiments of my invention may be made without departing from the spirit and scope thereof, it is to be understood that the specific embodiments described in detail herein are not to be taken in a limiting sense, since the scope of the invention is best defined by the appended claims.

I claim:

1. A furnace for heating a process fluid stream, comprising:

a burner supplied with fuel and combustion air for supplying process heat to the furnace, an inlet line of a process fluid stream for presenting the process fluid stream to the furnace, an outlet line of a process fluid stream in communication with said inlet line, an adjunct loop component for circulating in non-contact relation with flue gases emanating from the furnace a portion of the fluid stream thru the furnace in communication with said inlet line and said outlet line, comprising:

means for collecting heat from flue gases being exited from the furnace, and means for donating heat to combustion air entering the furnace, pump means operably positioned in communication with said adjunct loop component for circulating the fluid stream toward said means for collecting heat from the flue gases, and valve means in communication with the adjunct loop downstream of the pump means, the valve means operable for controlling circulation of the fluid stream thru the adjunct loop.

2. A furnace for heating a process fluid stream as described in claim 1, wherein:

said valve means is in communication with the process fluid stream for replenishing process fluid to the adjunct loop with fresh process fluid.

3. A furnace for heating a process fluid stream as described in claim 2, wherein:

said valve means for connecting the adjunct loop to the fluid stream connects the adjunct loop to an exit line of the furnace.

4. A furnace for heating a process fluid stream as described in claim 3, wherein:

said valve means includes a trickle valve component.

5. A furnace for heating a process fluid stream as described in claim 4, wherein:

said valve means in communication with said adjunct loop is at a position upstream of the means for collecting heat from the flue gases.

6. A furnace for heating a process fluid stream as described in claim 1, wherein:

said valve means includes a trickle valve component.

7. A furnace for heating a process fluid stream as described in claim 6, wherein:

a trickle valve component provides means for allowing a small portion of process fluid to exit the adjunct loop in order to constantly replenish a portion of fluid in the adjunct loop with fresh fluid.

8. A furnace for heating a process fluid stream as described in claim 1, wherein:

said valve means connects the adjunct loop to an inlet line of the fluid stream.

9. A furnace for heating a process fluid stream as described in claim 8, wherein:

said valve means is in communication with the process fluid stream for replenishing process fluid to the adjunct loop with fresh process fluid.

10. A furnace for heating a process fluid stream as described in claim 9, wherein:

said valve means includes a trickle valve component.

11. A furnace for heating a process fluid stream as described in claim 10, wherein:

said valve means includes a trickle valve member for allowing a small portion of process fluid to exit the adjunct loop in order to constantly replenish a portion of fluid in the adjunct loop with fresh fluid.

12. A furnace for heating a process fluid stream as described in claim 8, wherein:

said valve means for connecting the adjunct loop to the fluid stream in communication with the inlet line comprises a pump bypass valve component permitting flow of fluid thru the adjunct loop during a non-operating mode of said adjunct loop.

* * * * *